April 26, 1966   W. B. TEMPLETON   3,247,944
LINE FIND MECHANISM Filed April 30, 1963   8 Sheets-Sheet 1

INVENTOR.
WILLIAM B. TEMPLETON.
BY
*William P. Lamb*
ATTORNEY.

April 26, 1966 W. B. TEMPLETON 3,247,944
LINE FIND MECHANISM
Filed April 30, 1963 8 Sheets-Sheet 3

INVENTOR.
WILLIAM B. TEMPLETON.
BY
*Wallace P. Lamb*
ATTORNEY.

3,247,944
LINE FIND MECHANISM
William B. Templeton, Northville, Mich., assignor to Burroughs Corporation, Detroit, Mich., a corporation of Michigan
Filed Apr. 30, 1963, Ser. No. 276,738
6 Claims. (Cl. 197—127)

This invention relates generally to business machines and particularly to line find devices therefor.

It is the principal object of the invention, to provide for business machines an improved device for stopping the feeding of a record sheet, in relation to a process station, at a position corresponding to the location in the sheet of a line designating aperture.

Another object of the invention is to provide for a business machine having provisions for feeding a record sheet along a guideway to a processing station or printer, an improved line find device in which a sheet operated brake control member, normally in an ineffective retracted position to avoid the leading edge of a sheet in the guideway is directly sheet actuated to an effective position for operation by the sheet.

In connection with the next preceding object it is another object of the invention to provide for sheet actuation of a sheet feed brake mechanism to obtain a direct and positive brake operation in the interests of dependability of line find devices.

Another object of the invention is to provide a line find device of the above mentioned character which is efficient in operation and economical to manufacture.

A further object of the invention is to provide for the flexing of a sheet by a brake operating member to insure a desired abutting relationship between the brake operating member and a displaced edge of a perforation designating the next available line on the sheet.

It is a specific object of the invention to provide an improved line finding device in which a sheet actuated brake operator, normally in a retracted ineffective position, is sheet actuated, without applying the brake, to an effective position by the leading edge of a sheet for subsequent brake applying operation by an edge of a line designating perforation in the sheet.

Another specific object of the invention resides in accomplishing the ineffective and effective positions of a linearly movable brake operator by means of a cooperative relationship between the operator and a sinuous sheet guideway.

Other objects of the invention will become apparent from the following detailed description taken in connection with the accompanying drawings in which.

Figure 1:
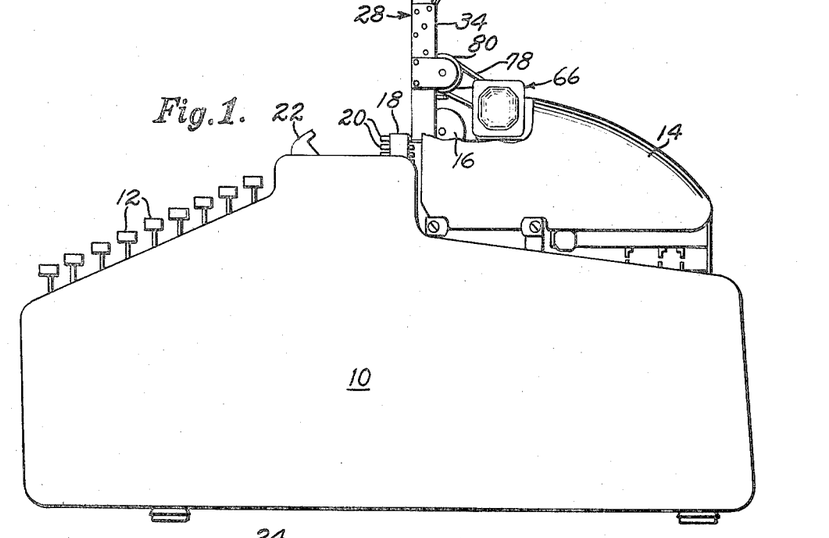
FIG. 1 is a side view of a business machine having a line find device embodying features of the invention.

Referring to the drawings by characters of reference, the business machine of FIG. 1 may be of any well known type for processing record sheets or cards, such as printing amounts in columns, and the machine is illustrated as including a mechanism housing 10, a keyboard 12 and an encased paper carriage 14. Mounted on the carriage 14 there is the usual roller type platen 16 and forwardly of the platen there is a print head 18 having a plurality of print elements 20 and a plurality of print hammers 22, only one of the latter of which is shown. As is well known in the operation of machines of the type illustrated, an amount to be printed is indexed by means of the keyboard 12 and upon depressing the well known motor bar, a machine cycle of operation occurs which includes the vertical positioning of the print head 18, in accordance with the indexed amount, followed by operation of the print hammers 22 to drive the selected ones of the print elements 20 against the platen 16.

The above generally described machine is a well known conventional type accounting machine and for a more complete description thereof reference may be had to the patent to Thomas M. Butler, No. 2,629,549, filed July 19, 1950, issued February 24, 1953, for "Automatic Function Control Mechanism for Accounting Machines."

Figures 2, 3, 4:
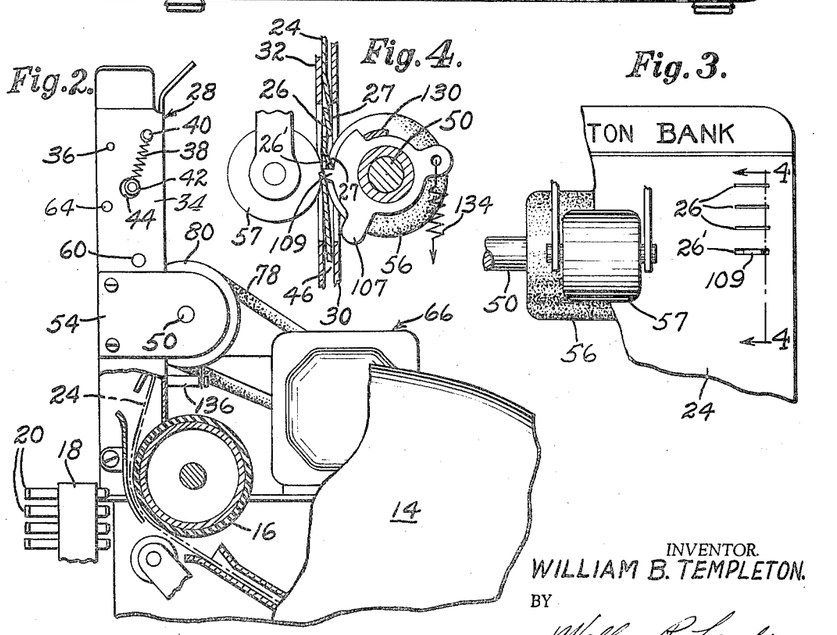
FIG. 2 is an enlarged fragmentary side view.
FIG. 3 is a fragmentary view of a record card used in connection with the line find device.
FIG. 4 is a vertical sectional view taken along the line 4—4 of FIG. 3.

A fragment of a record sheet 24, of a type suitable for use in connection with the present invention, is illustrated in FIG. 3. Adjacent the rightward side edge of the sheet there is a vertical column of horizontal slit-like perforations 26 which designate lines that have been printed on the card. The lowermost slit 26' designates, of course, the last line printed. These slits are preferably made with a punch that laterally displaces the card area immediately above the slit such that in said area a small portion 27 of the card projects forwardly of the card face and downwardly or so that the upper edge of the card slit is displaced from the plane of the card, FIG. 4. This provides an upper edge of the slit in position for abutment purposes in connection with the line find device hereinafter described in detail.

A vertical sheet guideway structure, designated in general by the numeral 28, is suitably mounted on the carriage 14 above the platen 16 and may include a rear guide member or upright plate 30 and a pair of front, laterally positioned guide members 31, 32. In the present construction, the rear guide plate 30 has forwardly extending side flanges 34 between which are positioned the pair of guide members 31, 32, pivotally mounted respectively on pivot pins 36 which are secured to the flanges 34. The guide members 31, 32 are biased toward guide plate 30 by individual springs 38. The springs 38 have upper ends anchored by pins 40 to the guide member flanges 34 and lower ends attached by pins 42 to the guide members 31, 32. The pins 42 extend through clearance apertures 44 in flanges 34, which permit pivotal movement of the guide members 31, 32 clockwise, as viewed in FIGS. 7 to 10. Normally, the pins 42 limit against the edges respectively of their clearance apertures 44 so as to position the faces of the guide members 31, 32 in spaced parallel relationship to the opposed face of the guide plate 30 to define a sheet guideway 46. The lower ends of the guide members 31 are bifurcated and the space or opening 33 between the legs of guide member 32 provides for the displacement of a small area of a sheet, as hereinafter described in detail.

Spaced from and behind the rear guide plate 30 there is a horizontal driven shaft 50 journaled in end bearings 52 and 52' which are rigidly mounted on the guide plate flanges 34 by brackets 54. Affixed to the driven shaft 50, between the guide members 31, 32 there is a pair of spaced apart sheet feed rollers 56 cooperable respectively with a pair of pressure rollers 57 to feed a sheet 24 along the guideway 46, the driven and pressure rollers projecting through clearance holes in the guide plate 30 and forming a bight within the guideway 46. The pressure rollers 57 are rotatably mounted on the lower ends of U-shaped levers 59, pivoted on a horizontal rod 60 which has its opposite ends secured in and to the opposite plate flanges 34. A pair of springs 62 are provided to urge the pressure rollers 57 into contact with the driven feed rollers 56, the springs being anchored to a cross rod 64 and attached respectively to upper arms of the levers 59.

Figure 5:
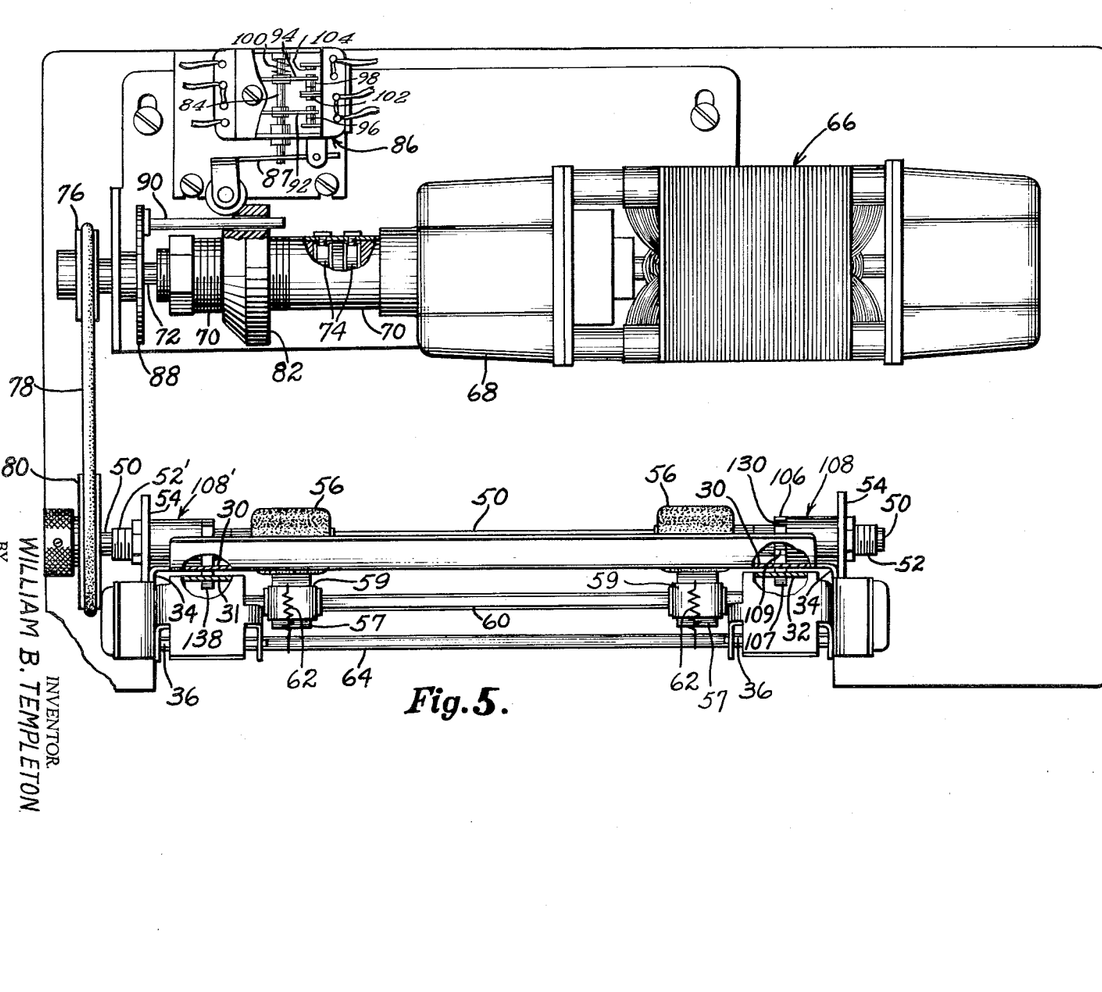
FIG. 5 is a plan view of a sheet feed and my line find device.
Figure 6:
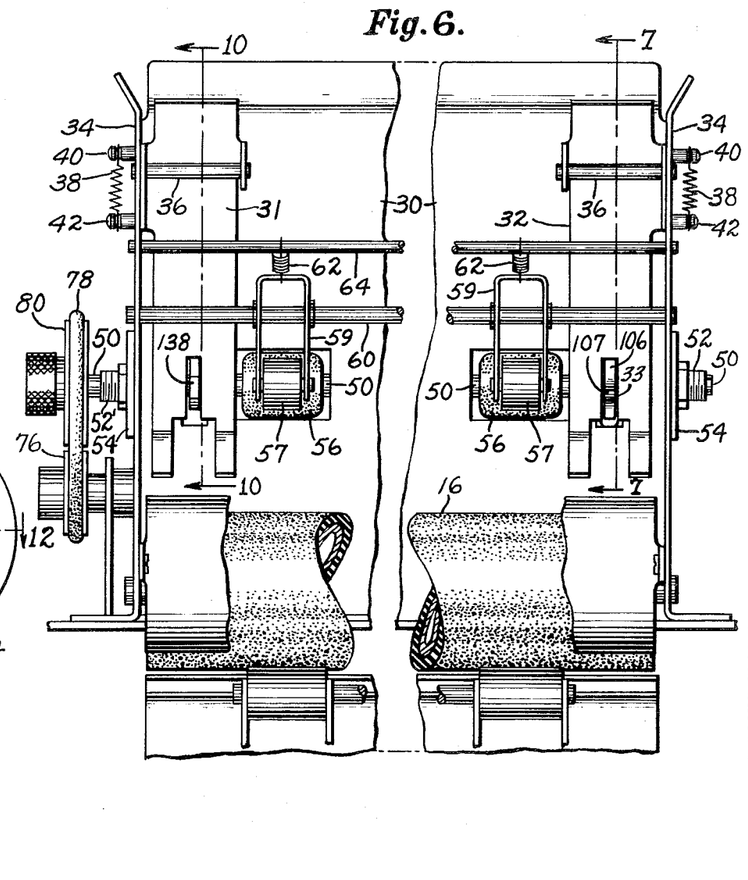
FIG. 6 is a front view.

A D.C. electric motor 66, FIG. 5 is provided to drive the feed rollers 56 and connected to the motor drive shaft there is a conventional speed reduction mechanism in a casing 68. Projecting from the casing 68 is a hollow or tubular drive shaft component 70, connected axially with another component 72 of the shaft by a slip clutch or friction drive connection 74, which may be of any suitable well known type. Affixed onto the shaft component 72 near the outer end thereof is a drive pulley 76 which is connected by a drive belt 78 to a driven pulley 80 on the sheet feed driven shaft 50.

Threaded onto and movable along the drive shaft component 70 there is an actuator 82 for a movable switch operating member 84 of a switch unit 86. The switch unit 86 is provided for stopping the motor in response to alignment of a sheet and for conditioning the circuit of the electric motor 66 preparatory to effecting a reverse operation of the motor. One end of the actuator 82 is beveled as a cam to engage one end of a switch operating lever 87. Affixed to the shaft component 72 for rotation therewith is an arm or disc 88 and carried by the arm is a rod 90 which extends parallel with the axis of the drive shaft through a bore in the switch operator 82. When the slip clutch 74 is effective, i.e., driving shaft component 72, the arm 88, through rod 90, rotates the actuator 82 which prevents the latter from moving axially along the drive shaft component 72. However, when the shaft component 72 is held against rotation, the actuator will be caused to move along the shaft component 70 in a direction determined by the direction of rotation of the shaft component 70.

Figure 14:
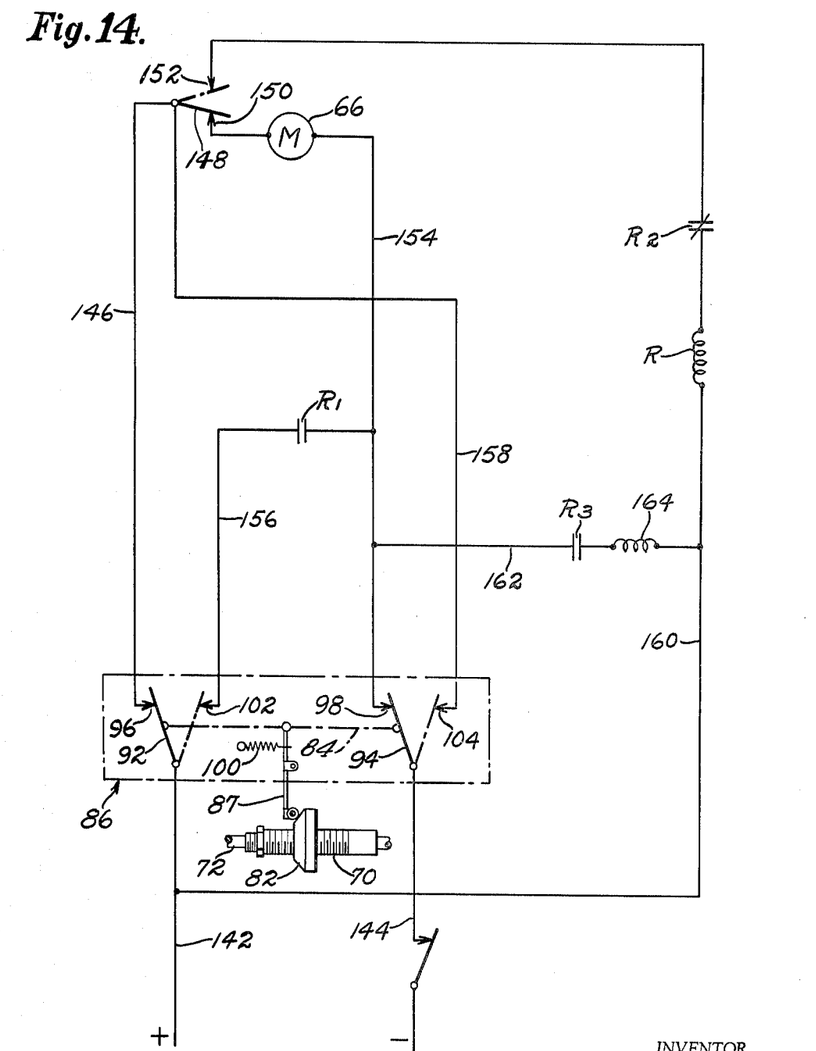
FIG. 14 is a diagrammatical illustration of a sheet feed control system for a line find device.

The switch 86 is a conventional type, diagrammatically illustrated in FIG. 14 as comprising a pair of movable contact members 92, 94 connected for movement together. Normally the movable contact members 92, 94 are held in engagement respectively with a pair of fixed contact members 96, 98 by a spring 100 and are movable to respectively engage a second pair of fixed contact members 102, 104 by the actuator 82.

Figure 10:
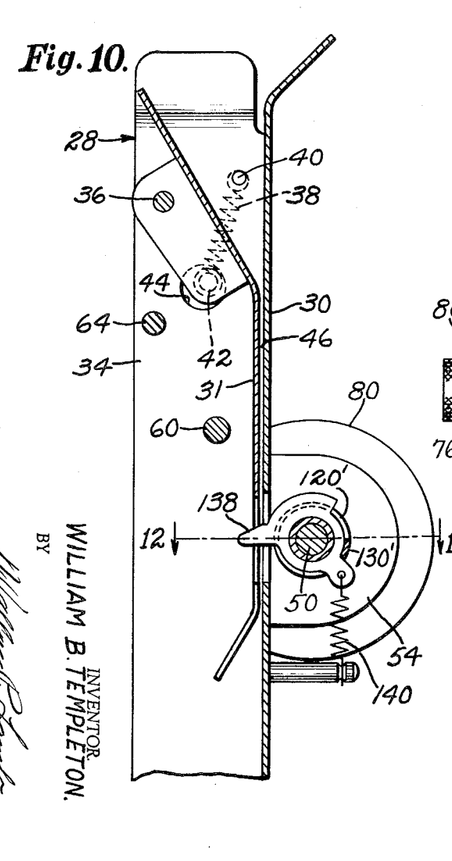
FIG. 10 is a vertical sectional view, taken along the line 10—10 of FIG. 6.

In accordance with my invention, I provide a sheet operated member or lever 106 to actuate a brake 108 to stop the sheet feed rollers 56 so as to stop a record sheet being fed downwardly in the guideway 46 at a position corresponding to the last line designating perforation 26' in the sheet. That is, the lever 106 is pivoted by an edge of the last made perforation in the sheet and actuates the brake 108 to stop the downward feeding of the sheet at a position such that the next available print line is presented to the print elements 20. The lever 106 and the brake 108 are mounted on the driven shaft 50 near the rightward end thereof, as seen in FIGS. 5 and 10. The lever 106 is mounted on a sleeve 110 which is rotatably mounted on the shaft 50. The brake operating lever 106 has a first sheet engaging arm 107 which normally projects across the sheet guideway 46 in the path of the leading edge of a sheet, and has a second sheet engaging arm 109 which is normally retracted. From its retracted position, the brake operating arm 109 is pivotal to a position extending across the guideway in registry with the opening in the adjacent one of the spring biased guide members 32. The length of the arm 109 is made such that when in its effective position extending across guideway 46, FIG. 8, the end of the arm engages the face of the sheet and displaces a small area of the sheet just below the last punched slit 26', the displaced portion being received in the opening in the guide member 32. The guide member spring 38 opposes the displacement of the guide member and in this manner there is a desired abutting relationship of the upper edge of the slit and arm 109.

Figure 11:
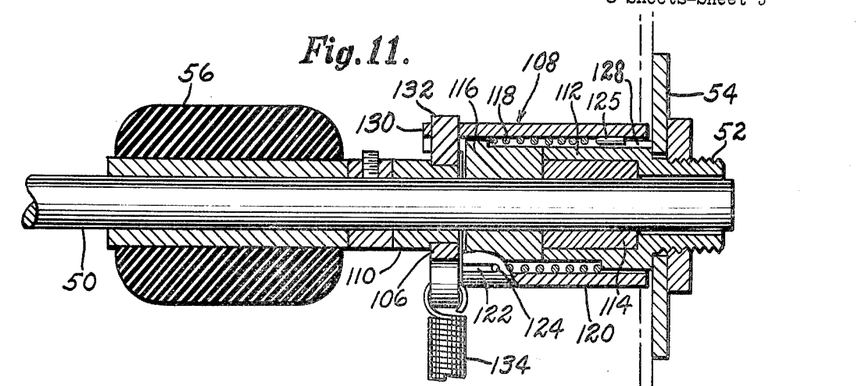
FIG. 11 is a vertical sectional view, taken along the line 11—11 of FIG. 7.

With particular reference to FIG. 11, it will be seen that the shaft bearing member 52 has an enlarged tubular end portion 112 which provides a bushing for rotatably supporting the shaft 50 which has a sleeve-like bearing member 114 affixed thereto. The outer peripheral surface of the tubular member 112 provides the fixed or stationary drum component of the brake 108, the other components being a rotatable brake drum 116 and a brake member or helical coil spring 118. As shown, the outer diameters of the stationary brake member 112 and the rotatable brake drum 116 are alike and are surrounded by the coil spring 118 which, as previously mentioned, is normally disengaged or expanded, as shown in FIG. 11.

Surrounding the brake spring 118 is a sleeve 120 which is provided in one end thereof with a slot 122 in which is retained a laterally bent end portion 124 of one end of the spring 118. The other end of the spring 118 has an axially extending end portion 125 which is anchored to the stationary brake member 112 in a slot 128 provided in the outer periphery of the latter. An extended portion or lug 130 projects from the inner end of sleeve 120 into the path of an abutment member 132 on the lever 106 as shown, for example, in FIG. 7. In its disengaged state, the brake spring 118 is held expanded by a second spring 134 which has a lower end anchored to the guide member 30 by a pin 136 and an upper end attached to the brake actuator lever 106. The spring 134 is overcome by the feed rollers 56 when a sheet is fed thereby downwardly in the guideway 46, the leading edge of the sheet engaging the lever arm 107 to rotate the latter counterclockwise, as viewed in FIGS. 7 to 9. At the same time that the brake actuator arm is being pivoted by the sheet, the arm 109 is being rotated from its normally retracted position into the path of the displaced edge 27 of the lowermost line designating perforation 26'. The positioning of the arm 109 in its effective position, projecting into the guideway 46, allows the brake spring 118 to contract, but not to the degree that would allow the braking force to be applied, the braking force being applied by the further displacement of the arm 109 by the sheet edge 26'. In addition to stopping the sheet feed rollers 56 and therefore the sheet, the brake 108 also initiates movement of the switch actuator 82.

Figure 12:
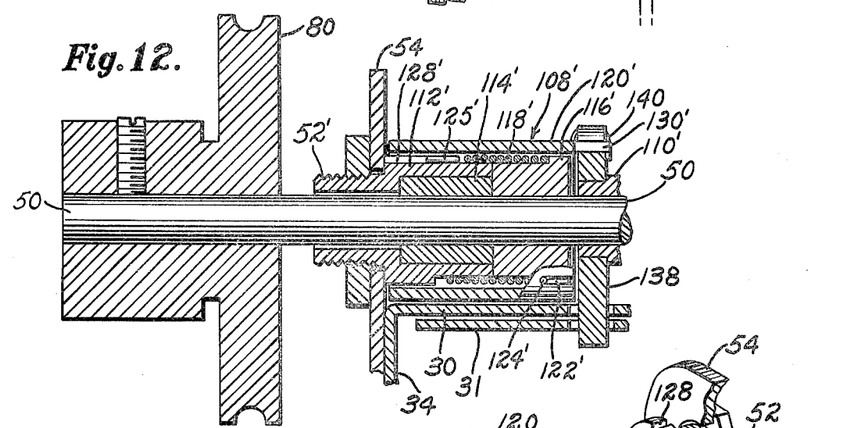
FIG. 12 is a horizontal sectional view, taken along the line 12—12 of FIG. 10.
Figure 13:
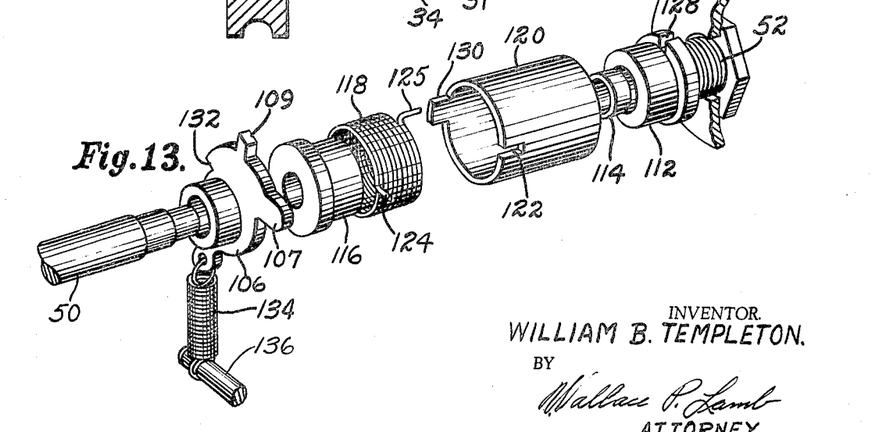
FIG. 13 is an exploded perspective view.

A second sheet operated brake 108' is provided to control operation of the switch actuator 82 and is mounted on the driven shaft 50, preferably adjacent the leftward end thereof, as seen in FIG. 5. The brake 108' is like the brake 108 hereinbefore described with the exception that brake 108' is normally engaged, as will be seen from a comparison of FIGS. 11 and 12. Accordingly, the corresponding parts of the brake 108' have been given primed numerals with reference to brake 108' so as to avoid unnecessary repetitious description. The brake 108' is actuated by an arm 138, FIG. 10, on shaft 50 projecting into the sheet guideway in the path of the leading edge of a sheet. The arm is biased to this position by a coil spring 140.

Referring now to the diagrammatical illustration of FIG. 14, the numerals 142, 144 designate respectively the main leads of a D.C. electric power source and connected respectively to the leads are the movable switch members 92, 94, of the switch unit 86. The movable switch members 92, 94 are shown in their normal positions respectively engaging fixed contacts 96 and 98 and are connected for movement together by the actuator 82 to engage respectively the fixed contacts 102 and 104. These switches are provided for the purpose of conditioning the circuit of the D.C. motor 66 to change the polarity thereof so as to effect reversal of the motor operation to eject a record sheet, which has been processed, from the guideway 46. The switch contact member 96 is connected by a lead 146 to a switch member 148 having fixed contact members 150, 152, the switch member 148 normally being in engagement with contact member 150 which is connected to one terminal of the motor 66. A lead 154 connects another terminal of the motor 66 to the contact member 98 of switch member 94.

The switch contact member 102 is connected by a lead 156 to lead 154 and thus to motor 66, and a lead 158 connects switch member 148 to the switch contact member 104. This provides a second circuit for the motor 66 and is used in effecting reverse operation of the motor.

A relay coil R is provided in a lead 160 which connects switch contact member 152 to the positive side or lead 142. Relay coil R has a pair of normally open contacts R1 in lead 156 and a pair of normally closed contacts R2 in lead 160, and a pair of normally open contacts R3 in a lead 162 that connects contact 98 to the plus side or main lead 142. The relay coil R is of the well known type which, when energized is mechanically latched in closed contact position, and in lead 162 there is a coil 164 which when energized releases the latched relay.

*Operation*

Figures 7, 8:
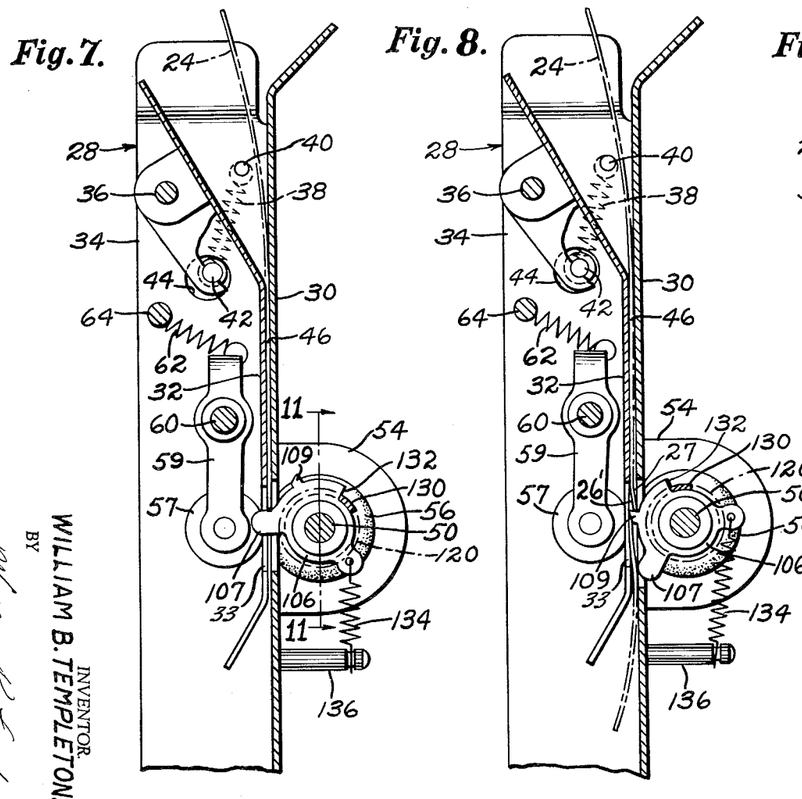
FIG. 7 is a vertical sectional view, taken along the line 7—7 of FIG. 6.
FIGS. 8 and 9 are views similar to FIG. 7, illustrating the progression of a sheet being fed to the printer.
Figure 9:
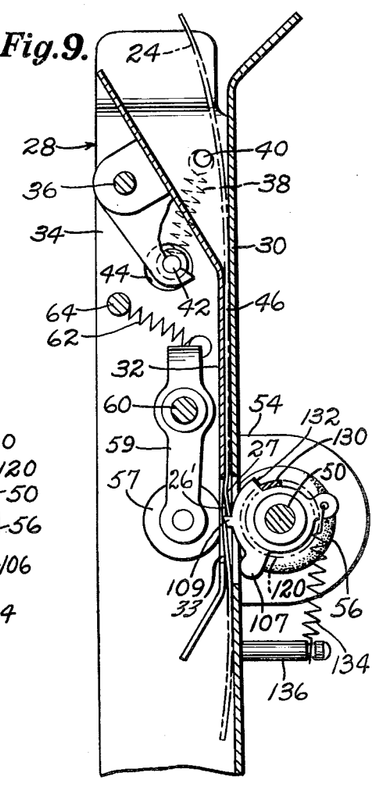

With reference particularly to FIG. 14, the diagrammatically illustrated control devices are in their normal positions which means that the sheet feed driving motor 66 is in operation providing, of course, that the line switch is closed. The circuit of the motor 66 is from main lead 142, switch contact members 92, 96, lead 146, switch contact members 148, 150, motor 66, lead 154, and switch contact members 98, 94 to the other main lead 144. The motor 66 is operating and driving the feed rollers 56, 57 in directions to feed a sheet downwardly within the guideway 46, the normally engaged coil brake spring 118' being ineffective to oppose rotation of the rollers in the downward feeding of a sheet. That is, on downward feeding of the sheet, the direction of rotation of the rollers 56, 57 is counter to the direction of winding of the coiled brake spring 118' and consequently the downward direction of sheet feed tends to expand the brake spring 118'. The lower, or leading edge of the sheet engages and rotates the brake arm 138 to further expand the coiled brake spring 118' and, at about the same time, the leading edge of the sheet engages and pivots the arm 107 counterclockwise, as shown in FIGS. 7, 8 and 9 until the arm 109 extends across the guideway 46. The end of the arm 109 engages the face of the sheet and pivots the guide member 32 against the action of spring 38 and when the last punched slit 26' approaches the end of arm 109, the spring 38 causes a small area of the sheet adjacent the slit to be displaced forwardly into the opening 33 in the guide member 32.

The sheet continues downwardly and the upper edge of the lowermost, or last line designating perforation made in the sheet engages the arm 109 and further pivots the arm to complete the contracting of the coiled brake member 118 tightly about the brake drums 112, 116. This, of course, stops the rollers 56, 57 to position the sheet with the next available print line in registry with the print elements 20. When the brakes stops the feed rollers 56, 57, the motor drive shaft component 72 is stopped because the frictional force of the pulley 80 and belt 78 is greater than the frictional force of the slip clutch 74. Consequently, rod 90 holds the actuator 82 from rotating with the motor drive shaft component 70 which causes the actuator to move leftwardly along the shaft, as viewed in FIGS. 5 and 14. This movement, as shown in FIG. 14, through the operation of lever 87, pivots the switch contact members 92, 94 away from contacts 96, 98 and into engagement with contact members 102, 104 respectively. The breaking of contact members 92, 96 and 94, 98 opens the circuit of and stops the motor 66, and the closing of contact members 92, 102 and 94, 104 conditions the circuit of the motor 66 to effect a reversal of operation thereof. Following the stopping of the sheet, the required bookkeeping operations of the machine are performed after which the last line of the sheet may be perforated and the sheet ejected upwardly from the guideway.

When a sheet is to be ejected from the guideway 46, the switch member 148 is moved to engage contact 152 to energize the relay R which is then latched closed under the control of the latch releasing coil 164. The energization of the relay coil R closes contacts R1, opens contacts R2 and closes contacts R3 in preparation for effecting a reverse operation of the motor 66. When the processing of the sheet in the guideway 25 has been completed, the switch member 148 is pivoted back into contact with the contact member 150 and as previously mentioned, although this may be done manually, in practice it would be preferable to operate the switch from a camshaft of the accounting machine or from the closing action of the machine carriage. In any event, the closing of switch member 148 with contact member 150 completes a circuit of the motor 66, the circuit being from main lead 142, switch contacts 92, 102, lead 156, contacts R1, lead 154, motor 66, contacts 150, 148, lead 158 and switch contacts 104, 94 to the other main lead 144. This circuit, of course, changes the polarity of the motor 66 causing it to rotate its drive shaft in a direction to feed the sheet upwardly within the guideway 46 for removal by the machine attendant. The sheet moves upwardly within the guideway 46 without opposition from either of the brakes 108 and 108', since the spring brake 118 is being released by such movement and the spring brake 118' is being held disengaged by the sheet. When the lower edge of the upwardly moving sheet reaches the point where the sheet disengages from the brake arm 138, the spring brake member 118' is released to contract and apply the brake to stop shaft component 72. As a consequence, the actuator 82 is caused to move to the right, facing FIGS. 5 and 14, and return the switch members 92, 94 to their normal positions. When this occurs, a circuit is made through the relay latching coil 164 from the now engaged contacts 94, 98, leads 154, 162, contacts R3, coil 164 and lead 160 to the main line 142. This energizes latch controlling coil 164 which releases the latch to break the holding circuit of relay R.

Figure 15:
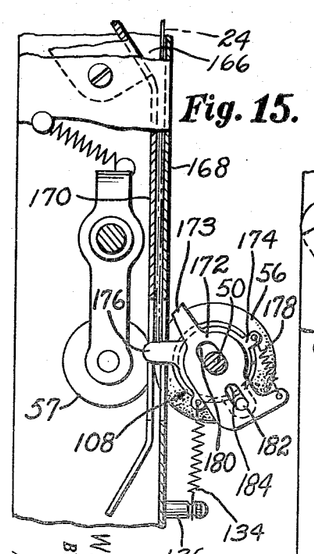
FIG. 15 is a vertical sectional view of a modification, showing operating parts of a line finding device in their normal positions.
Figures 16, 17, 18:
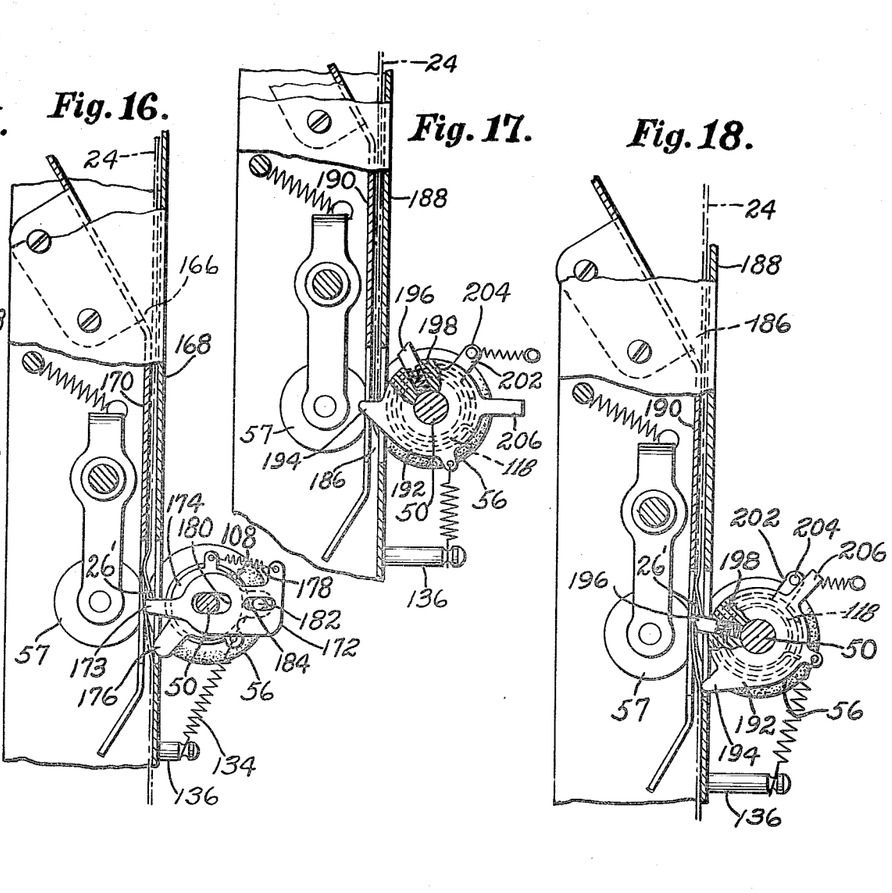
FIG. 16 is a view similar to FIG. 15, showing the operating parts in sheet stopping positions.
FIG. 17 is a vertical sectional view of another modification, showing operating parts of a line finding device in their normal positions.
FIG. 18 is a view similar to FIG. 17 showing the operating parts in sheet stopping positions.

Referring now to the modification of FIGS. 15 and 16, in the device shown, a sheet guideway 166 is defined by a pair of stationary plate members 168 and 170, arranged in spaced apart broadside relationship. Within the guideway 166 is the bight of the feed rollers 56 and 57 which are normally operating to feed a sheet to a process station, or printer. The driven roller 56 is mounted on the driven shaft and also the coil spring brake 108 shown in dotted lines. Mounted to rotate on the driven shaft 50 adjacent the brake 108 is a brake operating lever 172 which has an arm 173 in a normally retracted position withdrawn from the guideway 166 as shown in FIG. 15. A separate lever 174 is provided to control movement of the brake operating lever 172 between its retracted ineffective position and its effective position shown in FIG. 16. The lever 174 is mounted to rotate on driven shaft 50 and normally the free end of the lever, as at 176, extends across the guideway 166, as shown in FIG. 15. A coil spring 178 yieldably connects the levers together. An elongated aperture or slot 180 in the brake operating arm 172 allows for horizontal linear movement of the brake operating arm between its retracted and operating positions. A pin 182 affixed to lever 172 projects into an aperture 184 in lever 174, the aperture 184 being elongated longitudinally of lever 172 in line with the elongated aperture 180.

In the operation of the modified line find device of FIGS. 15 and 16, the lower or leading edge of a sheet being fed downwardly in the guideway 166 engages the arm 176 and pivots lever 174 counterclockwise. Because of lever connecting pin 182, the lever 172 follows lever 174, the displacement being calculated such that when the leading edge of the sheet passes the arm 176, the arm 173 of the brake operating lever 172 has been pivoted into the guideway 166 in the path of the displaced edge 27 of sheet perforation 26'. At the same time that the levers 172 and 174 are being pivoted by the leading edge of the descending sheet, the spring 178 is urging the lever 172 linearly toward the sheet to tension the sheet as indicated to insure a good abutting relationship between the displaced edge of perforation 26' and the lever arm 173. The operation of the lever 173 thus far has only taken up slack in the brake spring, but the sheet continues downwardly which further pivots the lever 172 to apply the brake, thus stopping the feeding of the sheet.

Referring now to the modification of FIGS. 17 and 18, there is shown, a sheet guideway 186 defined by a pair of stationary guide plates 188, 190 arranged in spaced apart broadside relationship. Within the guideway is the bight of the feed rollers 56 and 57 rotated by the driven shaft 50 on which the brake 108 is mounted as in the previously described line finding devices.

Freely rotatable on the driven shaft 50 there is a brake operating lever 192 having an arm 194 which normally projects into and across the guideway 186 for engagement and actuation by the leading edge of sheet 24 being fed downwardly in the guideway. Angularly displaced from the arm 194, clockwise therefrom, as viewed in FIG. 17, the lever 192 has a second arm 196 which is normally retracted from the guideway 186 and is pivotal to an effective position extending across the guideway, as shown in FIG. 18. In this position, the arm 196 is engaged by the upper displaced edge of the last used line designating perforation 26' and is pivoted to apply the brake 108 to stop the feed rollers 56, 57. In order to further displace the upper edge of the perforation 26' and thus effect a good abutting relationship between said edge and arm 194, the arm 196 is radially movable relative to lever 192, in the form of a plunger, biased outwardly by a coil spring 198. As a consequence of the provision of the outwardly biased arm 196, the spring 198 urges the end of arm 196 against the face of the sheet applying a pressure thereto which immediately below the perforation slightly flexes the sheet, FIG. 18, to provide the desired contact between perforation edge and arm 196.

Further in accordance with the invention, I provide a lost-motion connection between the lever 192 and the spring 18 such that the pivotal action of arm 194 by the leading edge of a sheet to position arm 196 in effective position does not contract the spring brake member 18. To this end, the spring brake member 18, which as before is normally expanded and therefore disengaged from its brake drum, is modified to provide on one end thereof a radially extending arm 202 having an abutment 204 in the path of rotation of an arm 206 on lever 192. In operation, when the leading edge of a fed sheet engages arm 194 and pivots lever 192 to position arm 196 in the pathway of the perforation edge, arm 206 is positioned near or against lug 204 and when the upper edge of sheet perforation 26' engages arm 196 and further pivots lever 192, the arm 206 pivots spring arm 202 to apply the brake 108.

Referring now to the modification of FIGS. 19 to 22, the machine of this modification includes an upright sheet guideway 210 defined by a rear guide member or plate 212 and a pair of front laterally spaced apart guide members or plates 214 and 216. The pair of front plates 214 and 216 are arranged in broadside relationship to the rear plate, preferably adjacent the side edges respectively of the rear plate. The rear guide plate 212 and front guide plates 214 and 216 can be and preferably are stationary.

Figure 19:
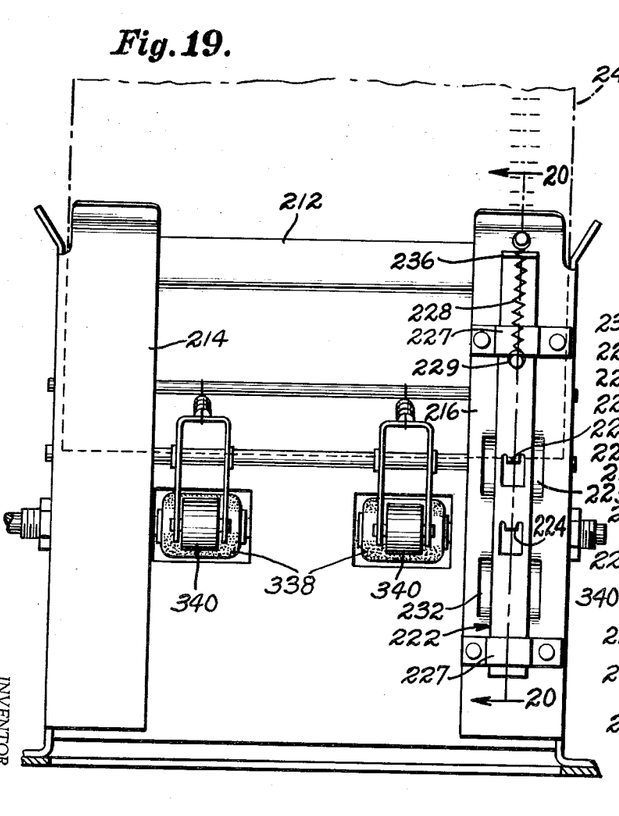
FIG. 19 is a front view of another modification of the invention.

A record sheet 24, illustrated in dot and dash lines, is fed downwardly within the guideway either manually or by suitable sheet feed mechanism to a process station herein represented as a print head 218 and a cooperating platen 221. Following the printing operation, the sheet 24 is provided with a perforation designating the last printed line by a punch (not shown). Preferably, the punch is designed to provide a horizontal slit-like perforation and displace laterally a small portion 220 of the sheet immediately above the slit to function as an abutment. The slit, or its displaced portion 220 designates the last line used on the record sheet and is employed in the next processing of the sheet for automatically stopping the sheet at a position to present the next available print line to the printer.

In accordance with my invention, I provide a vertically movable carrier or slide 222 that carries a pair of arms including a lower arm 224 for engagement by the lower or leading edge of a sheet and an upper arm 226 for engagement by the abutment 220, designating the last line used on the sheet. The slide 222 is mounted in upper and lower guide members 227, affixed to the front face of the sheet guideway member 216, and the arms 224 and 226 are formed out of the slide to project into the guideway 210. A helical coil spring 228 is provided to return the slide member 222 to its normal or "up" position, the spring having one end thereof connected to a stud 229 on the slide and the other end anchored by a stud to the guideway member 216. As shown, the stud 229 engages the upper guide member 227 as a stop, thus establishing the normal or "up" position of the slide member 222.

Figures 20, 21, 22:
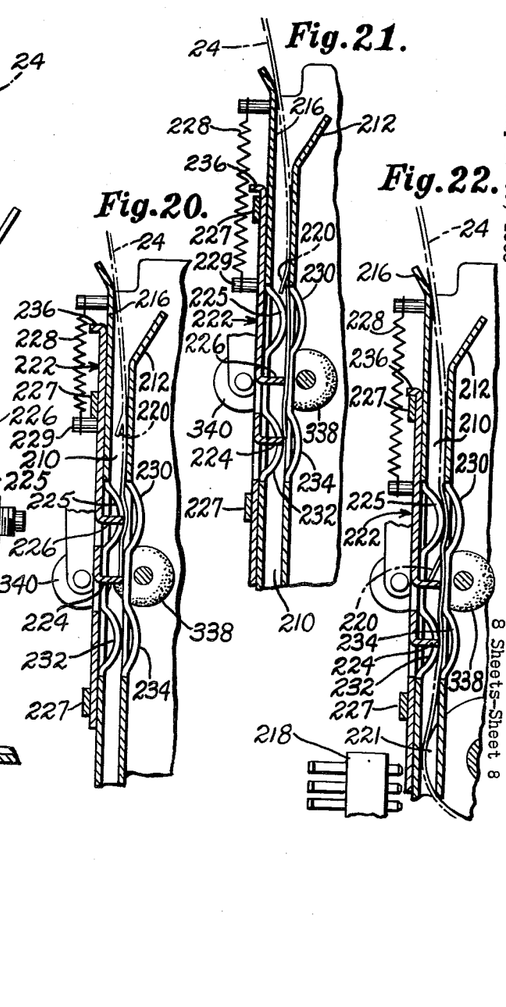
FIG. 20 is a vertical sectional view, taken along the line 20—20 of FIG. 19, showing certain operating parts in normal positions.
FIGS. 21 and 22 are views similar to FIG. 20, showing the progress of the sheet and the line find operating parts in the sheet stopping positions.

In order that the upper sheet stopping arm 226 is without the guideway 210 in the "up" position of slide 222 so as to avoid the leading edge of a descending sheet, I make the guideway 210 sinuous in form by providing complementary offset bends 225 and 230 in the guide plates 212 and 216 at a location including the "up" position of the sheet stop arm 226. The offset of the guideway bends 225 and 230 is made substantially equal to the distance between the opposed faces of the guide members 212 and 216 or length of arm 226, such that the end of the arm, when in the "up" position will be without guideway 210 as shown in FIG. 20. In this position of the sheet stopping arm 226, the arm 224 is in its effective position extending across the guideway 210 for engagement by the leading edge of sheet 24. Further, the arm 224 is in a position intermediate the upper offset portions or bends 225 and 230 and similar lower offset portions 232 and 234 of the sinuous guideway 210. The lower offset of the guideway is provided to extend around or by-pass the lower arm 224 when the latter is in its "down" position, FIG. 22, the purpose being to allow the sheet to move down past the arm 224 which in its down position is, in effect, retracted from the guideway. Both of the guide members 212 and 216 are vertically slotted to receive the arms 224 and 226. In its downward movement, the slide member 222 is limited by an outturned flange 236 on the upper end thereof abutting the guide member 227.

As previously mentioned, a record sheet to be processed may be fed downwardly within the guideway 210 either manually or by sheet feeding rollers. In the present machine a record sheet is fed downwardly within the guideway 210 by feed rollers including power driven rollers 338 and pressure rollers 340. The rollers 338 and 340 are laterally positioned between the pair of guide members 214 and 216 and are located between the upper and lower bends of the sinuous guideway. These rollers may have polished steel peripheries such that they will slip against the faces of a record sheet where the latter is stopped by the line finding device. Also, the feed roller drive means may be reversible so as to feed processed sheets upwardly for removal by the machine attendant.

Operation

In operation, a record sheet or card to be processed is dropped by the machine attendant into the guideway 210 and passing downwardly below the retracted upper arm 226 into the bight of the normally operating feed rollers 338, 340 with the leading edge of the sheet abutting the lower arm 224 of slide 222. As the rollers 338 and 340 feed the sheet 24 downwardly the slide 222 is now moved downwardly by the feeding action until the slide flange 236 engages the stop member 227. During this downward travel of the slide, the lower arm 224 moves to the position shown in FIG. 21 without the guideway, thus allowing the sheet to continue downwardly past the now retracted arm 224. As the lower arm 224 is moving downwardly to its ineffective or retracted position, the upper arm 226 is moving downwardly to its effective position, extending across the guideway 210. After the leading edge of the sheet 24 passes the lower arm 224, continued downward movement of the sheet brings the upper edge of the last punched line designating slit into abutment with the upper arm 226 which then moves the slide down until the latter is stopped by engagement of flange 236 engaging stop member 227 which presents the next usable line to the printer. It will be noted that full or partial retraction of slide 222 by the spring 228 may occur after the leading edge of a record sheet disengages from the lower arm 224 of the slide. However, retraction of the slide 222 is not objectionable since the edge 220 of the slit representative of the next available unused line will pass between the laterally positioned offset portions 232, 234 and engage the upper or line find arm 226 of the slide whereby the slide will be moved downward by the sheet until the stop member 227 is engaged. Where the feeding action is reversed, following the processing of the record sheet, the feed rollers 338, 340 and the spring 228 together function to raise the slide member 222 to its "up" position, as the sheet is being ejected upwardly. At the upper bend of the sinuous guideway 210, it will be noted that as the last punched line designating slit in the sheet approaches the upper arm 226, FIG. 20, the slight flexing of the sheet by the arm insures good contact by the lower edge of the sheet displaced portion 220 as the latter is further displaced by said sheet flexing action.

What is claimed is:

1. In a machine for stopping the feeding of a record sheet at a position corresponding to the location of a line designating horizontal slit-like perforation in the sheet, a pair of spaced apart members forming a vertical sheet guideway therebetween, one of said members biased for movement toward and away from the other of said members and having an opening therein to receive a displaceable sheet portion below the perforation, sheet feed means operable to feed a sheet downwardly within said guideway, a normally retracted brake member operable to stop said feed means, a normally retracted brake operating arm pivotal to a position projecting into said guideway for actuation by the upper edge of the perforation and with the free end of said arm urging displacement of said sheet portion into said opening, and means operatively connected to and for moving said arm into said position and actuated by the leading edge of the sheet.

2. In a machine for stopping the feeding of a record sheet at a position corresponding to the location of a line designating horizontal slit-like perforation in the sheet, a pair of spaced apart members forming a vertical sheet guideway therebetween, one of said members biased for movement toward and away from the other of said members and having an opening therein to receive a displaceable sheet portion below the perforation, sheet feed means operable to feed a sheet downwardly within said guideway, a normally retracted brake member operable to stop said feed means, a normally retracted brake operating arm pivotal to a position projecting into said guide way for actuation by the upper edge of the perforation and with the free end of said arm urging displacement of said sheet portion into said opening, and a second arm connected to said first-mentioned arm normally projecting into said guideway for actuation by the leading edge of a sheet.

3. In a record sheet handling apparatus, a sheet guideway, sheet feed means operable to feed a sheet along said guideway, a driving shaft, a clutch member connecting said feed means to said driving shaft and operable upon the stopping of said feed means to disengage said driving shaft therefrom, normally operating power means connected to drive said driving shaft, an actuator screwthreaded onto said driving shaft for movement axially thereof by said driving shaft upon the stopping of said feed means, a control member to control operation of said power means and actuated by axial movement of said actuator, a brake member operable on actuation thereof to stop said feed means, and a brake actuator positioned along said guideway and sheet operated to actuate said brake member.

4. In a record sheet handling apparatus for handling a sheet having a line designating perforation, a sheet guideway, sheet feed means at said guideway and operable to feed a sheet therealong, a normally operating electric motor having a drive shaft operatively connected to said sheet feed means, a switch member controlling said motor, a switch actuator rotatable with said drive shaft and operable by the stopping of said feed means to move axially of said shaft and move said switch member to stop said motor, a brake member operable to stop said feed means, and a brake actuator and sheet stop member movable by said motor via the leading edge of a record sheet from an ineffective position to an effective position to engage an edge of a line designating sheet perforation and further movable by said motor via said edge to stop the sheet and simultaneously operate said brake member.

5. In a record sheet handling apparatus for handling a sheet having a line designating perforation, a sheet guideway, a driven shaft mounted on said guideway, a pair of cooperable sheet feed rollers including a driven roller affixed to said shaft along said guideway, a normally operating electric motor having a drive shaft connected by a slip connection with said driven shaft and mounted on said guideway, a switch member controlling said electric motor, a switch member actuator screw threaded on to said drive shaft and movable axially thereof upon a stopping of the rotation of said driven shaft and operable to actuate said switch member to stop said motor, a connecting member rotatable with said driven shaft in engagement with said actuator to effect rotation of the latter by said driven shaft and operable upon stopping rotation of said driven shaft to effect axial movement of said actuator by rotation of said drive shaft, a normally disengaged spring brake member surrounding said driven shaft and releasable to engage and stop said driven shaft, and a sheet stop member rotatably mounted on said driven shaft coaxially of said brake member and movable by said motor via the leading edge of a sheet to an effective position within said guideway for engagement by an edge of a sheet perforation and further movable by said edge to stop the sheet and at the same time release said brake member.

6. In a record sheet handling apparatus for handling a sheet having a line designating perforation, a sheet guideway to guide a sheet to a print line, a horizontal driven shaft mounted on said guideway, a pair of cooperable sheet feed rollers along said guideway, one of said rollers affixed to said driven shaft, an electric motor having a drive shaft operatively connected to said driven shaft and mounted on said guideway, switch means settable in a position preparatory to feeding a sheet away from said print line and connected in circuit with said motor, a settable switch member in series circuit wth said switch means, said switch means and switch member mutually controlling said motor, a switch actuator threaded onto said drive shaft and movable axially thereof to actuate said switch means upon stopping of said driven shaft, a connecting member rotatable with said driven shaft in engagement with said actuator to effect rotation of the latter by operation of said driven shaft and connection therebetween to effect axial movement of said actuator by said drive shaft upon the stopping of said driven shaft, and a brake member surrounding said driven shaft to stop the latter to activate said switch actuator to stop said motor, said brake member biased to brake engaging position and normally held disengaged by a sheet.

References Cited by the Examiner

UNITED STATES PATENTS

| | | | |
|---|---|---|---|
| 2,204,579 | 6/1940 | Armond et al. | 318—267 X |
| 2,506,814 | 5/1950 | Sayre | 200—92 X |
| 2,670,068 | 2/1954 | Rutishauser et al. | 197—127 |
| 2,704,591 | 3/1955 | Bogert | 197—66 |
| 2,774,457 | 12/1956 | Salzberger | 197—127 |
| 2,827,105 | 3/1958 | Brundage | 318—267 X |
| 2,831,560 | 4/1958 | Oberholzer et al. | 197—128 |
| 2,832,454 | 4/1958 | Martin | 197—127 |
| 2,916,129 | 12/1959 | Parker | 197—128 |
| 2,992,377 | 7/1961 | Ekstrom | 318—267 |
| 3,100,037 | 8/1963 | Green et al. | 197—127 |
| 3,107,772 | 10/1963 | Templeton | 197—127 |
| 3,115,963 | 12/1963 | Harbor et al. | 197—127 |
| 3,137,379 | 6/1964 | Oberholzer et al. | 197—128 |

ROBERT E. PULFREY, *Primary Examiner.*